United States Patent [19]

McCullough

[11] 4,154,253

[45] May 15, 1979

[54] GREENHOUSE STRUCTURE

[76] Inventor: Glenn H. McCullough, 2827-134th Ave. NE., Bellevue, Wash. 98005

[21] Appl. No.: 861,955

[22] Filed: Dec. 19, 1977

[51] Int. Cl.² .............................................. A45F 1/16
[52] U.S. Cl. .................................. 135/1 R; 135/3 R; 135/4 R; 52/DIG. 10
[58] Field of Search ................. 220/19; 135/1 R, 3 R, 135/4 R, 15 PQ; 47/17; 52/80, 81, 63, DIG. 10

[56] References Cited

U.S. PATENT DOCUMENTS

| 2,956,808 | 10/1960 | Routson | 52/DIG. 10 |
| 3,276,148 | 10/1966 | Snelson | 52/DIG. 10 |
| 3,674,276 | 7/1972 | Street | 52/DIG. 10 |

FOREIGN PATENT DOCUMENTS 772048  10/1934  France ................................ 52/DIG. 10

OTHER PUBLICATIONS

Dome Book II, ©1971, pp. 95 and 118.

Primary Examiner—Ernest R. Purser
Assistant Examiner—Henry Raduazo
Attorney, Agent, or Firm—Dowrey & Cross

[57] ABSTRACT

A greenhouse structure composed of at least five intersected ring members providing a dome-shaped configuration over which a flexible cover is fitted. A particular manner of ring member intersection is employed to make the structure self-supporting. The flexible cover is provided with an arcuate closeable opening for access into the structure.

3 Claims, 8 Drawing Figures

FIG. 1
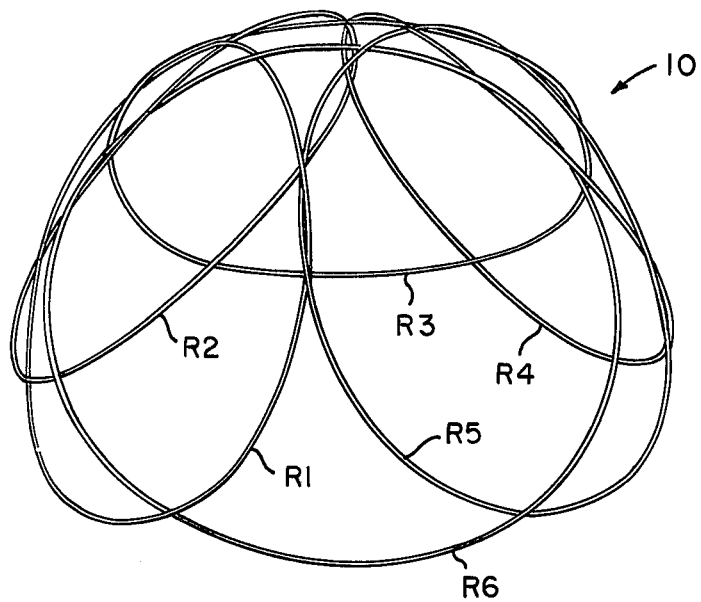
FIG. 2
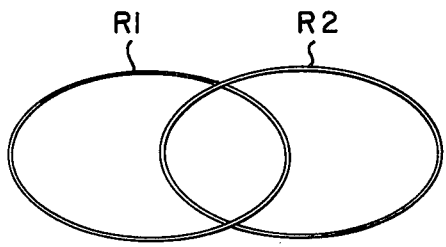
FIG. 3
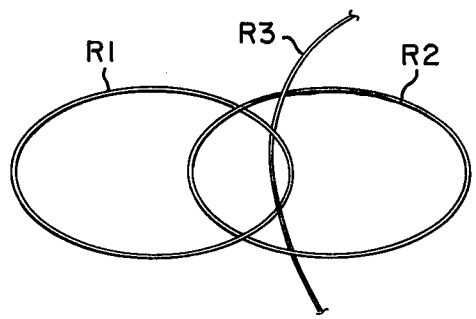
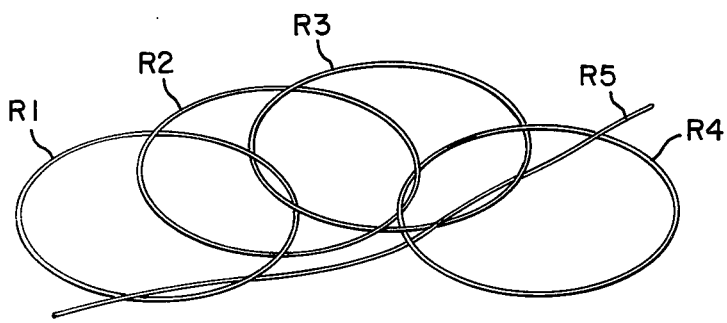
FIG. 4

GREENHOUSE STRUCTURE

This invention is a greenhouse having a structural framework composed of ring members intersecting one another in a particular manner. The framework may be assembled as a coplanar unit and then raised from the center to provide a self-supporting dome over which a covering may be applied. Each ring member must intersect at least four other ring members and consequently the framework must be constructed of at least five ring members.

FIG. 1 depicts an exemplary structural framework, having particular utility as a dome-like frame for a small structure, composed of six ring members;

FIGS. 2-5 depict an in sequence method of assembling six ring members for the framework of FIG. 1;

Figure 5:
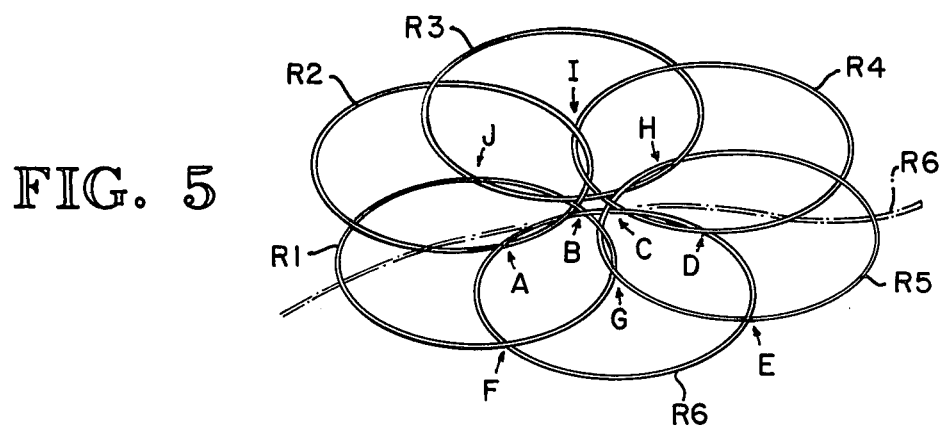

The essential manner of ring member intersection can be seen with reference to FIG. 5. Viewing ring member R6, that ring extends, starting at point A and going clockwise in sequence, over and under ring member R2, then over ring member R1, under ring member R5, over and under ring member R4, over ring member R5, and under ring member R1. Each of the other ring members intersects its adjacent ring members similarly. Thus, each ring member intersects four other ring members twice, once extending over and once extending under each of the four other ring members. Furthermore, it wil be observed that each ring member extends over and under one adjacent ring member (e.g. ring member R6 extends over and under ring member R2 at point A) without intermediately intersecting another ring member, then extends over another ring member and then under still another ring member (e.g. ring member R6 extends over ring member R1 at point B and then under ring member R5 at point C), then extends over and under still a fourth adjacent ring member (e.g. ring member R6 extends over and under ring member R4 at point D) without intermediately intersecting another ring member, extends under a ring member that it previously had extended over (e.g. ring member R6 extends over ring member R5 at point E and had previously extended under it at point C), and finally under a ring member that it previously had extended over (e.g. ring member R6 extends under ring member R1 at point F and had previously extended over it at point B).

The words "over" and "under" as used herein are to be interpreted to include their opposites inasmuch as the ring members could be intersected either way. For example, ring member R6 in FIG. 5 could extend at point A under and then over ring member R2, then under ring member R1 and over ring member R5, under and over ring member R4, under ring member R5 and over ring member R1, and thus yield essentially the identical structure. The words "over" and "under" as used herein are not to be interpreted to exclude the reversal exemplified above.

Upon the assembly of the structure in coplanar form as shown in FIG. 5, the structure may be raised from the center to provide the dome depicted in FIG. 1. The come is self-supporting and quite stable. The preferred structure is composed of ring members whose cross-sectional diameters are not greater than about 1/120th of their ring circumferences to enable the ring members to interlock without being stressed beyond their elastic limit. Additional stability may be attained simply by tying adjacent ring members together at the points of intersection where two ring members extend over and under one another such as at point G of FIG. 5 and as illustrated by tie 20 in FIG. 8 with respect to ring members R1 and R5.

The framework of FIG. 1 forms a generally hexagonal configuration. Looking at FIG. 5, the faces of the hexagon are located by points A,G; G,D; D,H; H,I; I,J; and J,A. Within the hexagon are two triangular configurations. Looking at FIG. 5, the triangular faces of one configuration are located by points A,D; D,I; and I,A. The triangular faces of the other configuration are located by points G,H; H,J; and J,G. Similarly, if five ring members were used, the geometric configuration would be pentagonal and triangular; if eight ring members were used, the geometric configuration would be octagonal and triangular; and so forth.

Once the framework of FIG. 1 has been formed, the ring members at the apex of the dome could be separated from one another by shifting them radially outward from one another to form a more spherical structure. This is so inasmuch as this radial movement at the apex causes the ring members at the lower periphery to shift radially inward toward one another. In fact, the radial shifting could be continued until the structure becomes an inverted dome with its apex at the bottom.

Figures 7, 8:
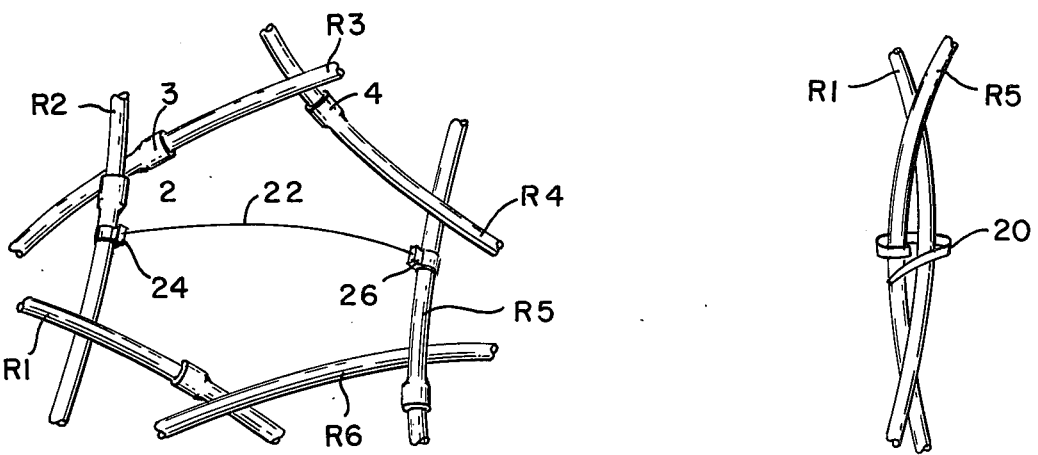
FIG. 7 depicts the top of the FIG. 1 framework fitted with a doming member to prevent formation of a depression in the flexible covering at the top of the FIG. 6 structure.
FIG. 8 depicts a pair of intersecting ring members secured together by a strap to enhance the stability of the FIG. 1 framework.

FIGS. 2-5 depict a preferred sequence of assembly suited for small structures such as portable greenhouses. The ring members may be jointed (as a 1, 2, 3, 4 and 5 depicted in FIG. 7) so that they may be threaded through adjacent ring members during assembly. Thus in FIG. 3, with ring members R1 and R2 having been assembled as shown in FIG. 2, ring member R3 is threaded over ring member R2, under and over ring member R1, under ring member R2, and then its ends are joined together at 3 (FIG. 7). Ring member R4 is threaded through ring members R3 and R2 in the same manner. Then ring member R5 is threaded over ring member R4, under and over ring member R3, under and over ring member R1, and then its ends are joined together at 5 (FIG. 7). Finally ring member R6 is threaded (as shown in dotted line in FIG. 5) over ring member R5, under and over ring member R4, under ring member R5, over ring member R1, under and over ring member R2, under ring member R1, and then its ends are joined together. The ring members could be provided in segments which could be joined together at the assembly site, thus simplifying packaging and shipped in a knocked-down form.

Figure 6:
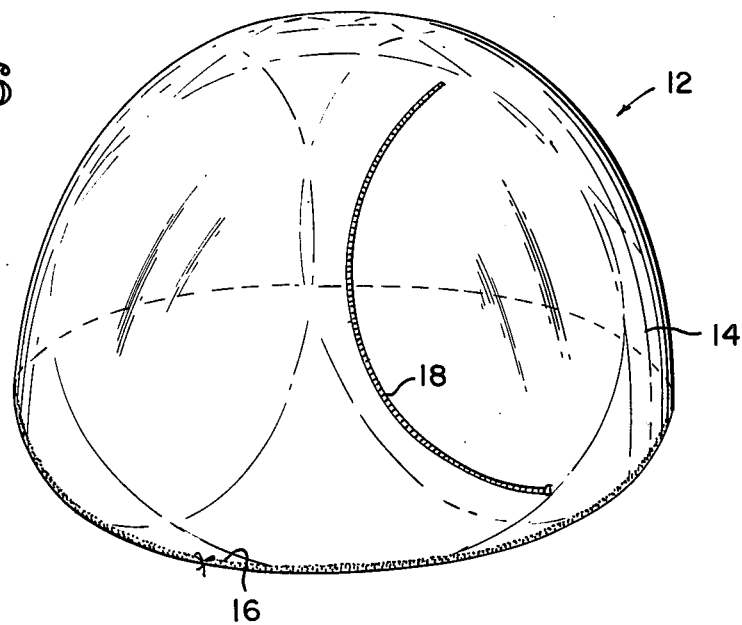
FIG. 6 depicts the FIG. 1 framework with a flexible covering for use as a greenhouse.

The cover 14 depicted in FIG. 6 includes an arcuate zipper 18 providing for access to the structure. When the cover is fabricated of a flexible material such as thin PVC (on the order of 8 MIL.), a drawstring 16 may be provided to tighten the cover about the base of the ring structure to secure the cover about the structure. The arcuate zipper 18 may be opened and the flap so provided laid back without compromising the tautness of the cover 14. The cover 14 may be provided in three panels with the seams arranged to extend from the apex of the structure to its base and each seam intersecting every other one of the intersection points A, G, D, H, I and J. If convenient for manufacture, each cover panel may itself be composed of two pieces joined from apex to base with the zipper 18 being located in one of the six pieces thus provided.

In addition to the access opening provided by zipper 18, additional openings as vents may be provided near the apex of the structure as desired. Also, the apex may be provided with a bowed strut 22 secured to nearby ring members as at 24 and 26 to crown the cover, thus to prevent the formation of a depression in which rainwater might collect.

A preferred greenhouse structure includes six ring members, 25 feet in circumference and 10 feet in diameter, which provides a height at the apex of 6.5 feet and a floor area of about 78.5 sq. ft. Each ring member is composed of five 5 foot sections of PVC pipe. The cover material may be vinyl or PVC film suitably U.V. stabilized.

Although one preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the appended claims.

I claim:

1. A greenhouse structure composed of: a plurality of ring members at least five in number, each ring member extending over and under at least four other ring members in a manner such that each ring extends, in sequence, over and under a first ring member, over a second ring member, under a third ring member, over and under a fourth ring member, over the third ring member, and under the second ring member, said ring members being positioned with respect to one another such that the structure is dome-shaped with a raised apex; and a flexible cover fitted over the ring members and secured thereto at the base, said cover having an arcuate closeable opening therein for access to the structure interior.

2. The structure of claim 1 including a bowed strut secured to adjacent ring members at the apex of the structure to support the top portion of the cover.

3. The structure of claim 1 wherein each ring member is composed of several pieces of flexible tubing which, when joined together, may be interconnected with other assembled ring members.

* * * * *